Patented Apr. 30, 1946

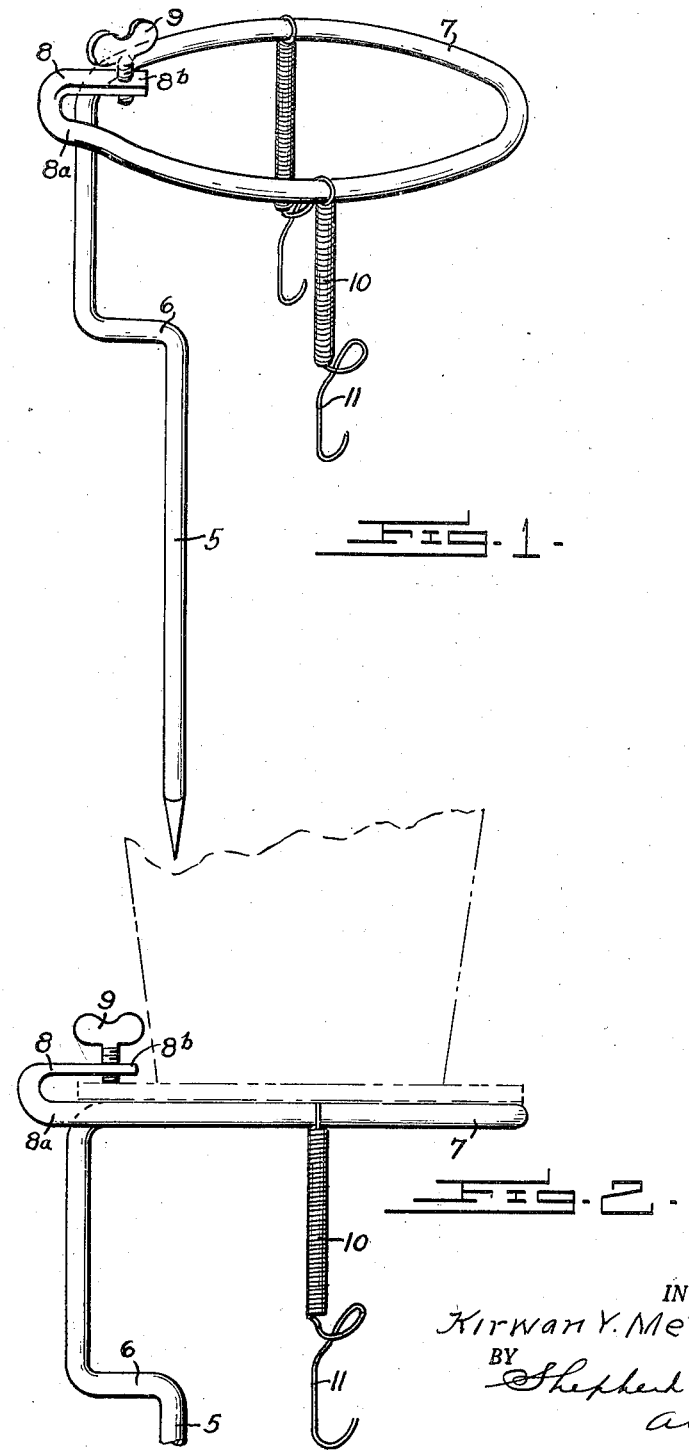

2,399,498

UNITED STATES PATENT OFFICE 2,399,498

FLOWER HOLDER FOR CEMETERY USE

Kirwan Y. Messick, Arlington, Va.

Application August 21, 1944, Serial No. 550,462

4 Claims. (Cl. 248—156)

The invention relates to a holder for either flower pots or flower baskets in cemeteries.

The primary object of the invention is to provide an article of this nature so constructed that it may be manufactured and sold at a low cost, will securely hold either a flower pot or a flower basket against upset by wind, animals or children, will accommodate receptacles of widely varying shape, and when not holding a flower receptacle will not throw such shade as to discolor the grass therebeneath.

Further advantages of the invention will be set forth in the detailed description which follows.

In the accompanying drawing:

Fig. 1 is a perspective view, and

Fig. 2 is a side view of the device of the invention.

Like numerals designate corresponding parts in all of the figures of the drawing.

The holder is made of a single and continuous piece of material bent to form the main stem 5 that is pointed at its lower end to adapt it to be forced into the ground by foot pressure applied to the integral horizontal step 6. At the top of the stem the material is bent to form a horizontal ring 7. This ring defines a substantially complete circle and the material is then continued outwardly beyond the circle to form an upwardly and inwardly bent tongue 8, the terminal end of which lies in spaced relation to the run 8ª by which tongue 8 is carried. The tongue 8 is preferably, but not necessarily, flattened at 8ᵇ and a set screw 9 is threaded therein. When a simple vase or pot constitutes the carrier of the flowers it may be set inside the ring 7 or if it is very large in diameter it may seat upon ring 7 and be held in place by springs 10 which carry hooks for engagement with such pot.

The device is of especial utility as a holder for flower baskets. Baskets used as floral pieces are usually provided with a relatively wide bottom to prevent accidental upset. These wide bottoms project beyond the bodies of the baskets and present an outstanding ledge adapted to enter between 8 and 8ª and to be clamped firmly to the holder by the set screw.

The springs 10 may carry one or more hooks 11, adapted to engage over the ledge of either a flower basket or pot.

When the device is not being used to support a flower pot or basket the open ring 7 permits the free passage of sunlight and consequently the grass is not discolored by heavy patches of shade.

Any suitable material may be employed, according to whether the demands of economy are deemed more important than non-corrosiveness. Iron is economical. Galvanized iron and brass, for example, would be rustless, but would cost more. I do not exclude the widely heralded plastics. Many of these plastics are not only strong and tough, but they are long lived, rustless and lend themselves to decorative effects through a wide raneg of opalescent colors.

I may, if desired, omit the set screw and so proportion the space between 8 and 8ª that the basket base will wedge itself within this space. A material will be used having a certain measure of resiliency to permit this to be done.

It is to be understood that the invention is not limited to the precise construction disclosed, but that it includes within its purview whatever changes fairly come within either the terms or the spirit of the appended claims.

Having described my invention, what I claim is:

1. A flower holder formed of a single piece of material bent to form a ground piercing stake, a horizontal ring at the top thereof and an integral tongue lying in such spaced relation to the ring as to receive the base of a flower basket therebetween.

2. A structure as recited in claim 1 wherein said stake is bent to form a horizontal step between the ring and the lower end of said stake.

3. A structure as recited in claim 1, in combination with a plurality of helical springs engaged at one of their ends with the ring and provided at their other ends with basket engaging hooks.

4. A structure as recited in claim 1 wherein the tongue carries a set screw for engagement with a basket base.

KIRWAN Y. MESSICK.